US011821048B2

(12) United States Patent
Kitamura et al.

(10) Patent No.: US 11,821,048 B2
(45) Date of Patent: Nov. 21, 2023

(54) HOLE-OPENING BIT AND TAP HOLE OPENING METHOD USING SAME

(71) Applicant: JFE STEEL CORPORATION, Tokyo (JP)

(72) Inventors: Yohei Kitamura, Tokyo (JP); Tomohiko Kawakami, Tokyo (JP); Kohei Horinouchi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 52 days.

(21) Appl. No.: 17/439,219

(22) PCT Filed: Mar. 10, 2020

(86) PCT No.: PCT/JP2020/010162
§ 371 (c)(1),
(2) Date: Sep. 14, 2021

(87) PCT Pub. No.: WO2020/189393
PCT Pub. Date: Sep. 24, 2020

(65) Prior Publication Data

US 2022/0162717 A1 May 26, 2022

(30) Foreign Application Priority Data

Mar. 19, 2019 (JP) ................................. 2019-050676

(51) Int. Cl.
*C21B 7/12* (2006.01)
*F27D 3/15* (2006.01)

(52) U.S. Cl.
CPC .............. *C21B 7/12* (2013.01); *F27D 3/1527* (2013.01)

(58) Field of Classification Search
None
See application file for complete search history.

(56) References Cited

U.S. PATENT DOCUMENTS 4,784,230 A 11/1988 Cherrington et al.
6,883,624 B2 4/2005 McDonough
(Continued)

FOREIGN PATENT DOCUMENTS

CN 201981229 U * 9/2011
CN 106869800 A 6/2017
(Continued)

OTHER PUBLICATIONS

Jun. 2, 2020 Search Report issued in International Patent Application No. PCT/JP2020/010162.
(Continued)

*Primary Examiner* — Scott R Kastler
(74) *Attorney, Agent, or Firm* — Oliff PLC

(57) ABSTRACT

A hole-opening bit that can simplify an operation for opening a tap hole for installing a burner lance for raising the temperature of a furnace bottom of a blast furnace, which allows the blast furnace to be started up in a relatively short time after long-time blast stoppage or after a furnace cooling accident, by efficiently heating the furnace bottom, and a tap hole opening method using the hole-opening bit. A hole-opening bit used to open the tap hole in the furnace bottom of the blast furnace including chips on rear surfaces of a furnace drilling surface of the hole-opening bit such that outermost ends of the chips are located inside of an outermost end of the hole-opening bit.

3 Claims, 1 Drawing Sheet

(56) References Cited

U.S. PATENT DOCUMENTS

| | | | |
|---|---|---|---|
| 7,040,424 B2 | 5/2006 | Yong et al. | |
| 2006/0060389 A1 | 3/2006 | Hadin et al. | |
| 2006/0162965 A1 | 7/2006 | Hadin | |
| 2009/0308663 A1 | 12/2009 | Patel et al. | |
| 2022/0162717 A1* | 5/2022 | Kitamura | C21B 7/12 |

FOREIGN PATENT DOCUMENTS

| | | | |
|---|---|---|---|
| CN | 206783703 | U | 12/2017 |
| CN | 107989550 | A | 5/2018 |
| CN | 207435473 | U | 6/2018 |
| JP | H03-70257 | U | 7/1991 |
| JP | H05-14140 | U | 2/1993 |
| JP | 2006-307258 | A | 11/2006 |
| JP | 2011-149065 | A | 8/2011 |
| JP | 2012-62546 | A | 3/2012 |
| JP | 2014-173146 | A | 9/2014 |
| JP | 2016-30833 | A | 3/2016 |
| RU | 2 325 443 | C2 | 5/2008 |
| RU | 2 377 383 | C2 | 12/2009 |
| RU | 2 378 480 | C2 | 1/2010 |
| WO | 2017/115097 | A1 | 7/2017 |
| WO | 2019/021042 | A1 | 1/2019 |

OTHER PUBLICATIONS

Apr. 6, 2022 Office Action with Search Report issued in Chinese Patent Application No. 202080016917.4.

Apr. 14, 2022 Office Action issued in Russian Patent Application No. 2021129585.

Apr. 20, 2022 Extended Search Report issued in European Patent Application No. 20772849.4.

Jan. 24, 2023 Office Action issued in Korean Patent Application No. 10-2021-7025786.

Aug. 17, 2023 Office Action issued in Russian Patent Application No. 2023118843.

* cited by examiner

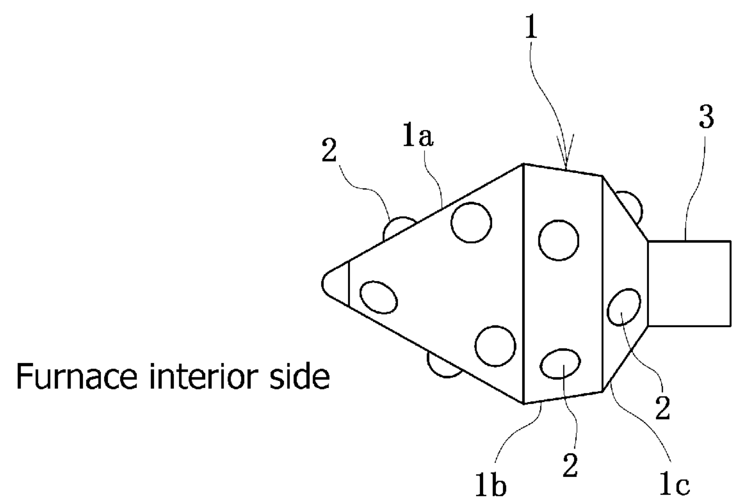
1
3
2
1a
Furnace interior side
2
1b
2
1c

HOLE-OPENING BIT AND TAP HOLE OPENING METHOD USING SAME

TECHNICAL FIELD

The present invention relates to a hole-opening bit for opening a tap hole or the like in a blast furnace, and particularly to a hole-opening bit used for opening a hole for installing a burner lance used at a start after the blast stoppage in the tap hole, and to a tap hole opening method using the hole-opening bit.

BACKGROUND ART

A blast furnace is a facility that performs temperature rising, reduction and melting of iron ores using a high-temperature reducing gas, which is generated by a reaction between high-temperature air and oxygen blasted from a tuyere portion with coke and pulverized coal and produces pig iron and slag from a tap hole provided in the lower portion of the tuyere portion. In a normal blast furnace operation, reaction heat in the furnace and heat supply from the tuyere are well balanced, allowing the blast furnace to be stably operated. However, it may be necessary to stop blasting into the blast furnace due to operation trouble, equipment trouble in the blast furnace or production adjustment. It may also be necessary to stop the blast furnace for a long period due to repair work resulting from aging of the blast furnace. During the blast stoppage, the temperature (hereinafter referred to as the furnace temperature) of charged materials and molten materials in the furnace lower due to heat extraction from the furnace body and a furnace bottom, suction of air through the tuyere and the like.

As the furnace temperature decreases, the viscosity of the slag increases, making it difficult to discharge molten pig iron and slag from the tap hole provided below a tuyere height. When blasting in such a state, the molten pig iron and slag, which are generated by a high-temperature gas generated in front of the tuyere, cause an increase in the liquid level of the molten pig iron and slag (molten pig iron, molten slag or a mixture thereof) remaining in a lower portion of the furnace. In such a case, no problem is caused as long as molten pig iron and slag fed from above the tuyere raises the temperature of the molten pig iron and slag remaining in the furnace bottom so that the temperature gradually recovers to an appropriate level of the furnace temperature. However, once the liquid level of the molten pig iron and slag reaches the tuyere level without the recovery of furnace temperature and thus blocks the tuyere, means for supplying heat to the inside of the furnace becomes unavailable to lead a furnace cooling accident, which causes a heavy economic loss.

In a case of causing the furnace cooling accident, even though gas is blasted from the tuyere portion as means for supplying heat for the blast furnace, the tuyere portion is again blocked with the generated molten material. A conventional method for recovering from the furnace cooling accident involves, first, blocking tuyeres except for one or two tuyeres positioned above the tap hole with refractories or the like during blast stoppage, blowing oxygen into the furnace from the tap hole and the nonblocked tuyeres, and, after semi-molten material present between the tap hole and the tuyeres is thus discharged from the tap hole, filling a resultant space inside the furnace with coke, and then starting the blast. In this method, after a cycle of raising the temperature of the furnace bottom by a high-temperature gas flowing between the tap hole and tuyeres and smoothly discharging the molten pig iron and slag generated accompanying with blasting is established, the tuyeres in an adjacent portion are opened, and then the number of the open tuyeres is gradually increased until the blast furnace recovers to normal operation. However, this process requires one or two months at most. Additionally, the blast of oxygen or the like is performed by humans, and thus high in safety risk.

Since the furnace temperature is low at a startup after the blast stoppage, the blast furnace is exposed to a high risk of the furnace cooling accident. To start up the blast furnace after the blast stoppage or the like without causing the furnace cooling accident, a conventional method involves increasing the coke ratio in the furnace before the blast stoppage and, without immediately blowing pulverized coal after the blasting, raising the temperature (heat compensation) until pulverized coal blowing can be started. In this method, the ratio of coke to be charged is reduced after stable discharge of the molten pig iron and slag is confirmed, and thus the usage ratio of coke, which is more expensive than pulverized coal, increases, causing a problem that the manufacturing cost of molten pig iron per 1 ton is increased in a case where the blast is stopped.

There is also proposed a method of starting blasting of a blast furnace involving installing a burner in a tap hole formed in a furnace bottom of a blast furnace to combust a fuel and efficiently heating the furnace bottom, allowing the blast furnace to be started up in a short time after long-time blast stoppage, and a burner for increasing the temperature of furnace bottom (Patent Literature 1). Moreover, in order to discharge molten pig iron in the blast furnace to the outside, a hole-opening bit for opening a hole in the tap hole is also proposed (Patent Literature 2 and Patent Literature 3).

CITATION LIST

Patent Literature

Patent Literature 1: Japanese Patent Laid-Open No. 2016-30833

Patent Literature 2: Japanese Patent Laid-Open No. 2006-307258

Patent Literature 3: Japanese Utility Model Laid-Open No. 5-14140

SUMMARY OF INVENTION

Technical Problem

When a hole is opened using the hole-opening bit as disclosed in Patent Literature 2 or 3 in a normal operation, the tip of the hole-opening bit is melted by the high temperature of the molten pig iron flowing out from the furnace interior. Also, since the furnace internal pressure is exerted, a force that pushes the hole-opening bit outward is exerted, and thus it takes less trouble in extracting the hole-opening bit. However, it is during the blast stoppage when the hole is opened in the tap hole to install a burner for raising the temperature of the furnace bottom or a lance having a function of blowing a combustion-supporting gas for raising the temperature of the furnace bottom (hereinafter collectively referred to as a burner lance). During the blast stoppage, the temperature in the furnace is low, and even if the material is outflowed, most of it is not molten pig iron but slag, leading to an insufficient amount of heat for melting the hole-opening bit. Thus, when a tap hole for installing a burner lance is opened using the hole-opening bit as disclosed in Patent Literature 2 or 3, coke flows into a gap between the tap hole and the hole-opening bit after the tap hole is penetrated and disadvantageously acts as resistance, which often causes a problem that the hole-opening bit is prevented from being pulled back or that a molten material mainly including slag in the furnace gets into the tap hole together with the coke to prevent the hole-opening bit from being pulled back.

When the hole-opening bit cannot be pulled back, conventionally, it is further pushed forward and inserted into a coke charged layer at a high temperature in the interior of the furnace and melted, and then the rod is pulled back. In this case, the interior of the tap hole may be filled with the molten material, and thus the hole needs to be opened again, which is a time-consuming process. Furthermore, when it is attempted to pull back the hole-opening bit toward the outside of the furnace and, as a result, the bit is cut off from the rod, it is necessary to melt the hole-opening bit by using oxygen. In this case, an operation for oxygen washing and a procedure for opening the hole again are required, leading to an even longer operation time.

An object of the present invention is to propose a hole-opening bit that can simplify an operation for opening a tap hole for installing a burner lance for raising the temperature of a furnace bottom of a blast furnace, which allows a startup of a blast furnace in a relatively short time after long-time blast stoppage or after a furnace cooling accident, by efficiently heating the furnace bottom situated below the tuyere height, and to propose a tap hole opening method using the hole-opening bit.

Solution to Problem

In order to solve the above-described problems inherent to the conventional art and to achieve the above-described object, the inventors of the present invention have made diligent studies and, as a result, arrived at development of a novel hole-opening bit described below. That is, the present invention provides a hole-opening bit used for opening a tap hole in a furnace bottom of a blast furnace. The hole-opening bit includes a chip on a rear surface of a furnace drilling surface of the hole-opening bit such that an outermost end of the chip is located inside of an outermost end of the hole-opening bit.

Note that the hole-opening bit according to the present invention has a more preferable solution as below:

(1) the hole-opening bit is used for opening a hole in the tap hole for installing a burner lance for raising a temperature of the furnace bottom.

Moreover, the present invention provides a tap hole opening method for opening a hole for installing a burner lance for raising a temperature of a furnace bottom of a blast furnace in a tap hole of the blast furnace bottom by using a hole-opening machine equipped with the above-described hole-opening bit.

Advantageous Effects of Invention

The hole-opening bit of the present invention includes the chip attached to the rear surface of the furnace drilling surface. Thus, even when the molten material that has flowed back during the hole opening flows into the hole-opening bit on the furnace exterior side, the chip provided on the rear surface can drill the molten material having flowed into a portion of the hole-opening bit on the furnace exterior side when pulling back the hole-opening bit to the outside of the furnace, whereby the hole-opening bit can be discharged to the outside of the furnace.

BRIEF DESCRIPTION OF DRAWING

FIG. 1 is a schematic diagram illustrating a configuration of an example of a hole-opening bit of the present invention.

DESCRIPTION OF EMBODIMENT

The hole-opening bit according to the present invention will be described below.

FIG. 1 is a schematic diagram illustrating a configuration of an example of the hole-opening bit of the present invention. In the example illustrated in FIG. 1, a hole-opening bit 1 includes chips 2 attached to a drilling surface 1*a* on the furnace interior side and also to rear surfaces 1*b* and 1*c* of the drilling surface 1*a*. The chips 2 are made of a material harder than a target substance to be drilled and cut the target substance by coming into contact with the substance to be drilled. Typically, the chip 2 uses a hard metal alloy for the material, and is sometimes referred as superhard chip or blade body. The chip 2 can be attached by a welding or the like. Note that 3 represents a hole-opening rod for supporting the hole-opening bit 1.

The rear surfaces of the drilling surface of the hole-opening bit 1 refer to the surfaces 1*b* and 1*c* that are closer to the hole-opening rod 3 than the position of the attachment surface with the maximum diameter, among the surfaces 1*a*, 1*b*, and 1*c* where the chips 2 are attached. That is, the rear surfaces of the drilling surface are surfaces that, when a molten material flows into the hole-opening bit on the furnace exterior side and then the hole-opening bit is pulled back, come into contact with the molten material. Moreover, it is preferable to attach the chips to the rear surfaces such that the chips come into contact with the molten material having flowed into the hole-opening bit on the furnace exterior side or its solidified material when pulling back the hole-opening bit. Alternatively, it may be preferable to attach the chips to positions where the chips do not come into contact with the target substance to be drilled when the hole-opening bit is moved forward.

The hole-opening bit used for opening a tap hole typically includes a chip attached to a front surface of the hole-opening bit, that is, to a position where the hole-opening bit comes into contact with the target substance to be drilled, so that the target substance to be drilled can be cut when the hole-opening bit is moved forward (see, for example, Patent Literatures 2 and 3). However, the inventors of the present invention have found that, when a burner lance for raising the temperature of the furnace bottom needs to be installed, the molten material in the furnace is very likely to flow back at the time of the hole-opening. In other words, the inventors have found that it is not enough to have the function of drilling only when the hole-opening bit moves forward, and that it is effective to attach the chips 2 to the rear surfaces 1*b* and 1*c* of the hole-opening bit as well.

In Patent Literature 3, a hard blade body, which corresponds to the chip in the present invention, is attached not only to the front surface of the hole-opening bit but also a rear surface that is closer to the hole-opening rod than the attachment surface with the maximum diameter of the hole-opening bit such that the outermost end of the hard blade body is positioned outside of the outermost end of the hole-opening bit. However, the hard blade body in Patent Literature 3 is installed to cover a front portion of a blow hole in order to suppress blocking of the blow hole, not to drill a molten material flowing into the hole-opening bit on the furnace exterior side when the bit is pulled back. That is, the hard blade body functions differently from the chip of the present invention. In Patent Literature 3, no chip is attached to an inner position in the radial direction which is closer to the rod, that is, a position where that the outermost end of the chip is located inside of the outermost end of the hole-opening bit. In other words, in order to realize the function, which is needed for the present invention, to drill a molten material having flowed into the hole-opening bit on the furnace exterior side when pulling back the hole-opening bit, the hole-opening bit in Patent Literature 3 fails to achieve the object of the present invention.

To achieve the object of the present invention, it is effective to attach the chip such that the outermost end of the chip is located inside of the outermost end of the hole-opening bit. More specifically, the hole-opening bit preferably includes the chip attached such that the innermost part of the chip is located, in the radial direction, inside of a midpoint between an outer circumferential position of the rod and the outermost position of the hole-opening bit.

As described above, in a method of raising the temperature of a molten material and charged material in a blast furnace by blowing a combustion-supporting gas and a liquid fuel or an inert gas, or only a combustion-supporting gas through a tap hole immediately before starting up the blast furnace with a low furnace temperature due to a long-time blast stoppage caused by facility or operation trouble, facility repairs, or the like, the hole-opening bit 1 of the present invention contributes to shortening the time required for the hole-opening operation included in the process of opening a tap hole, installing the burner lance, and starting blasting.

Specifically, when the molten material fails to be sufficiently discharged to the outside of the furnace before the blast stoppage is started, or when a molten material is generated during the blast stoppage due to suction of air through a tuyere portion or the like during the blast stoppage and thereby the molten material level at the furnace bottom portion is increased, the molten material flows back into the tap hole when the hole is opened. In such a case, even if the tap hole is opened again by temporarily stopping the backflow, the molten material flows back into the tap hole as well, causing it difficult to install the burner lance. In such a case, the hole-opening bit is pulled back to temporarily block the tap hole, and a hole is opened again to a depth smaller than that of the tap hole, and water, air, or both are blown into the hole, so that it becomes possible to prevent the backflow of the molten material while temporarily cooling a deeper portion of the hole, making it possible to open to the hole to the depth of the tap hole.

When the backflow of the molten material from the inside of the furnace is observed, advancing the hole-opening process may cause such a case that the molten material that has flowed back flows into the hole-opening bit on the furnace exterior side and the hole-opening bit cannot be pulled back out of the furnace. In the conventional art, the hole-opening bit is further pushed in and inserted into a coke charged layer in the furnace, and the hole-opening bit is melted and then the hole forming rod is pulled back. In this case, the tap hole needs to be opened again, requiring a long-time hole-opening operation. Furthermore, in a case where the hole-opening bit is cut off from the hole forming rod when pulled back out of the furnace, it is necessary to melt the hole-opening bit by using oxygen. In addition to the operation of oxygen washing and the process for opening the tap hole again, a material for blocking the tap hole is eroded and the depth becomes unclear due to the oxygen washing, which may make it difficult to perform the above-described operation.

According to the hole-opening bit 1 of the present invention illustrated in FIG. 1, the chips 2 are attached to both the drilling surface 1*a* on the furnace interior side and the rear surfaces 1*b* and 1*c* on the furnace exterior side, and it is possible to open and drill holes in both the inward and outward directions of the furnace by scraping the blocking material of the tap hole, coke and slag by rotation and strike of the tip 2. Consequently, even in a situation where the molten material flows back from the inside of the furnace, it is possible to open the hole for installing the burner lance while cooling the backflowing molten material and thus to pull back the hole-opening bit. It has not been conventionally known how much load is applied to the bit and rod when pulling back the hole-opening bit with the chip attached to the rear surfaces. The inventors of the present invention have examined, under various conditions, whether a solidified molten material can be drilled in a situation where the molten material is flowing back, and as a result, found that the load to the bit or rod required for drilling during pulling back is not excessive compared to the load required for hole-opening in the furnace inward direction and that drilling can be successfully achieved at a normal pulling back speed. When the load is large during drilling, the load applied to the rod is monitored using a load cell or the like while lowering the speed of pulling back, whereby the bit and the rod can be pulled back without causing damage.

EXAMPLE

An example of the present invention will be described. However, the conditions in the example are examples of one condition adopted to confirm the feasibility and effectiveness of the invention, and the invention is not limited to this one condition. The present invention may adopt various conditions as long as the object of the present invention can be achieved without departing from the gist of the present invention.

Example 1

A tap hole is opened to install a burner lance at a startup after normal blast stoppage. Two types of hole-opening bits having a shape as illustrated in FIG. 1 are used; one has a maximum diameter of $\phi$70 mm and the other has a maximum diameter of $\phi$110 mm. After confirming the penetration by the hole-opening bit with a diameter of $\phi$70 mm, the hole-opening rod cannot be pulled back from the furnace, and hence strike and rotation are applied to the hole-opening bit in the opposite direction. As a result, the bit is pulled back in a sound condition. Moreover, after the inside of the tap hole is observed, solidified slag is confirmed around the area where the hole-opening bit could not be pulled out. In the past, strike and rotation were repeatedly applied to hole-opening bit in the opposite direction or the hole-opening bit was melted with oxygen, until it could be removed from the hole forming rod. However, it is confirmed that the hole-opening bit of the present invention can be pulled back without being damaged. It is also confirmed that the hole-opening bit with $\phi$110 mm can successfully perform the hole-opening and be pulled back.

INDUSTRIAL APPLICABILITY

The hole-opening bit according to the present invention can be pulled back without being damaged even in a case where the molten material flows back into the tap hole. Thus, the hole-opening bit of the present invention can be utilized in various vertical melting furnaces other than blast furnaces in which a hole to be opened may be such a situation.

REFERENCE SIGNS LIST

1 Hole-opening bit
1*a* Drilling surface
1*b*, 1*c* Rear surface
2 Chip
3 Hole-opening rod

The invention claimed is:

1. A tap hole opening method for opening a hole for installing a burner lance in a tap hole of a furnace bottom of a blast furnace, the method comprising:

drilling open the hole for installing the burner lance in the tap hole using a hole-opening machine equipped with the hole-opening bit, the hole-opening bit comprising:

a furnace drilling surface at a furnace interior side of the hole-opening bit, the furnace drilling surface being configured to drill open a tap hole in a furnace bottom of a blast furnace, the tap hole being dimensioned for installing the burner lance for raising a temperature of the furnace bottom;

a rear surface at a furnace exterior side of the hole-opening bit, the rear surface being configured to come into contact with molten material when the hole-opening bit is pulled back toward an outside of the blast furnace;

a rod extending from the furnace exterior side of the rear surface in an axial direction of the hole-opening bit; and a chip positioned on the rear surface such that:

an outermost end of the chip is located inside of an outermost end of the hole-opening bit in a radial direction, and an innermost part of the chip is located inside a midpoint between an outer circumferential position of the rod and the outermost end of the hole-opening bit in the radial direction.

2. A tap hole opening method for opening a hole for installing a burner lance in a tap hole of a furnace bottom of a blast furnace, the method comprising:

drilling open the hole for installing the burner lance in the tap hole using a hole-opening machine equipped with a hole-opening bit, the hole-opening bit comprising:

a furnace drilling surface at a furnace interior side of the hole-opening bit, the furnace drilling surface being configured to drill open the tap hole;

a rear surface at a furnace exterior side of the hole-opening bit, the rear surface being configured to come into contact with molten material when the hole-opening bit is pulled back toward an outside of the blast furnace; and a chip positioned on the rear surface such that an outermost end of the chip is located inside of an outermost end of the hole-opening bit in a radial direction.

3. The tap hole opening method according to claim 2, further comprising:

pulling back the hole-opening bit toward the outside of the blast furnace.

* * * * *